United States Patent

[11] 3,557,804

| [72] | Inventor | Nathan B. Lerner<br>Chicago, Ill. |
|---|---|---|
| [21] | Appl. No. | 726,163 |
| [22] | Filed | May 2, 1968 |
| [45] | Patented | Jan. 26, 1971 |
| [73] | Assignee | W. Braun Company<br>Chicago, Ill.<br>a corporation of Illinois |

[54] A LADIES COMPACT
2 Claims, 4 Drawing Figs.

| [52] | U.S. Cl. | 132/83 |
|---|---|---|
| [51] | Int. Cl. | A45d 33/00 |
| [50] | Field of Search | 132/83,<br>83.5, 83.6; 220/60, 37, 38, 82, 83; 73/431 |

[56] References Cited
UNITED STATES PATENTS

| 3,388,600 | 6/1968 | Gorgens et al. | 73/431 |
| 1,466,790 | 9/1923 | Crocker | 220/82 |
| 2,737,189 | 3/1956 | Morningstar et al. | 132/83 |

*Primary Examiner*—Louis G. Mancene
*Assistant Examiner*—Gregory E. McNeill
*Attorney*—Max R. Kraus ABSTRACT: The invention comprises a cover for a container, such as a lady's compact or the like, in which the cover is provided with an enlarged opening and means adjacent said opening for receiving and retaining a mirror and a disc superposed over said mirror in a recessed portion of the cover without the use of extraneous fastening means or the like.

PATENTED JAN 26 1971
3,557,804
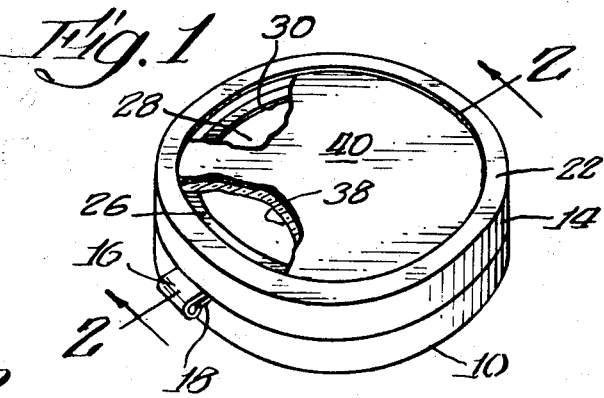
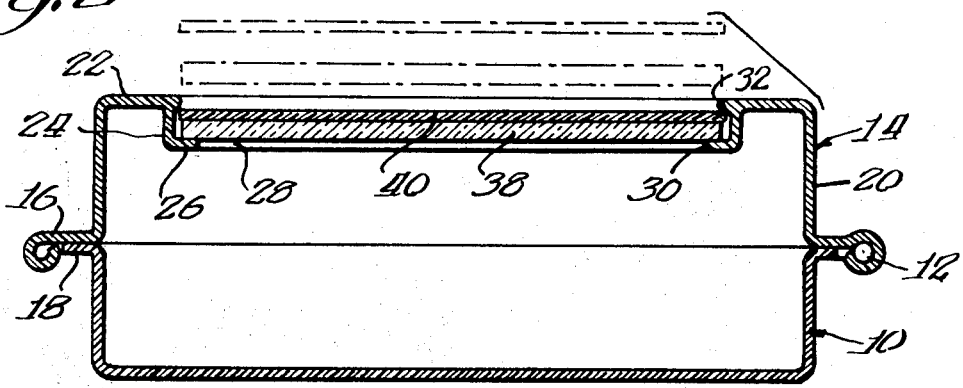
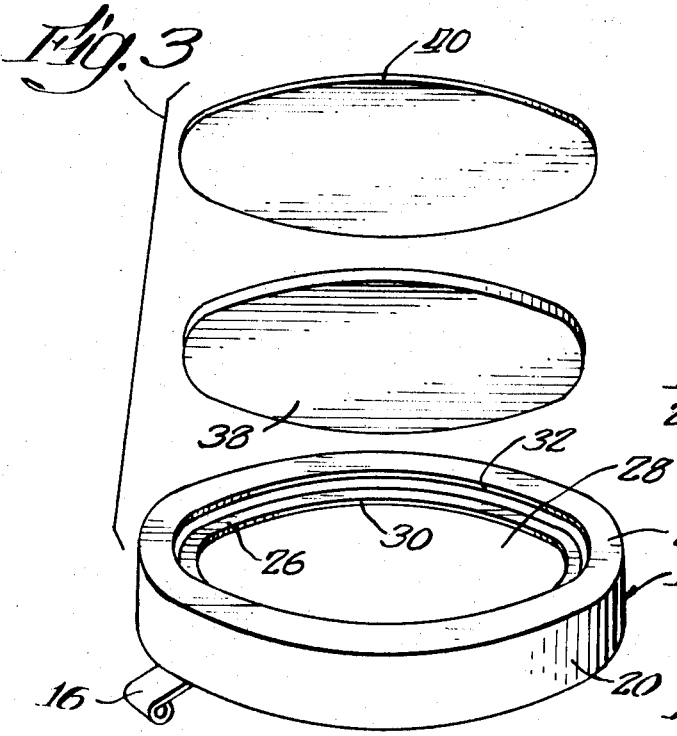
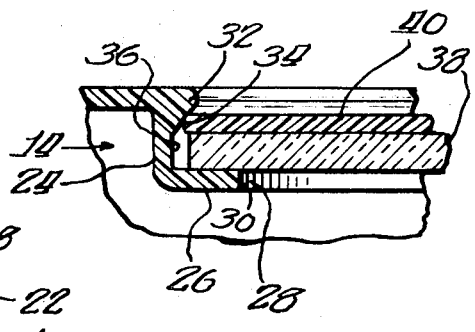
Inventor:
Nathan B. Lerner
By Max R. Kraus
Atty.

A LADIES COMPACT

BRIEF SUMMARY

One of the objects of this invention is to provide an improved cover for a container such as a lady's compact or the like provided with means for retaining a mirror in an enlarged opening of said cover, which mirror closes said opening and which permits the mirror surface to face inwardly of the cover.

Another object of this invention is to provide a cover having an enlarged opening adapted to receive a mirror and a disc positioned over said mirror and to be retained in said cover without the use of extraneous fastening means, whereby the mirror viewing surface is directed inwardly so that when the cover is opened, as in a compact, the mirror surface is exposed.

Another object of this invention is to provide a compact having means for retaining a mirror in a recessed portion of the cover and in which the cover may be made of a plastic material or the like.

Other objects will become apparent as this description progresses.

BRIEF DESCRIPTION OF THE DRAWINGS

In the drawings:

FIG. 1 is a view of the invention herein as applied to a lady's compact, with a portion broken away;

FIG. 2 is an enlarged central sectional view taken on line 2—2 of FIG. 1;

FIG. 3 is an exploded perspective view of the parts forming the cover member; and FIG. 4 is an enlarged sectional view of a portion of the cover, showing particularly the manner in which the mirror and the disc are retained.

While the invention is shown and described particularly in connection with a lady's compact which houses powder, a powder puff and the like, it will be understood that the invention is applicable to other uses and is not limited to compacts.

The compact, as shown, is formed of an annular lower portion or body member generally designated by the numeral 10, to which is hingedly secured as at 12 a cover or top member generally designated by the numeral 14. The cover member has a conventional snap lock 16 which locks with a lip 18 on the lower body member 10, as best shown in FIG. 2. The snap lock retains the cover in a locked position relative to the body member.

The invention resides in the cover or top member 14. Said member includes an annular sidewall 20 and an annular top or end wall 22 which extends inwardly of the sidewall 20. Extending inwardly of the top end wall 22 is an annular wall 24 and an annular flange 26. The annular wall 24 is substantially at right angles to the end wall 22 and the flange 26 is substantially at right angles to the annular wall 24. An enlarged opening 28 is formed in the cover, which opening is bounded by the inner peripheral edge 30 of the flange 26.

The annular wall 24 adjacent the top or end wall 22 is provided with an inwardly extending annular lip 32, best shown in FIG. 4, which has an inclined surface 34. The cover as thus described is preferably made of plastic material and may be integrally molded in an injection molding machine. The inwardly extending annular wall 24 and the inwardly extending flange 26 form a recessed portion generally indicated at 36 below the plane or top of the end wall 22 to receive and retain therewithin a mirror as well as a disc. For example, a vanity mirror 38 of circular shape is positioned to rest on the flange 26, the mirror surface facing inwardly into the container. The mirror is thus positioned in the recessed portion of the cover. A circular disc 40 of plastic or the like is superposed or positioned to rest on the mirror 38 and is locked in position by means of the inwardly extending annular lip 32, as more clearly shown in FIG. 4.

Both the mirror 38 and the disc 40 are inserted into the recessed portion 36 from the outside, that is, the mirror is first inserted and then the disc is inserted by pushing it inwardly to pass the lip 32. This is possible by virtue of the plastic construction of both the lip and the disc, as when the disc is pushed inwardly the lip 32 would be somewhat compressed as would be the disc, to permit the disc to be inserted into the recessed portion. After the disc passes the lip, the lip as well as the disc will return to their normal position and lock the mirror and disc in place, as shown in FIG. 4. In this manner the enlarged opening 28 of the cover is closed by the mirror and the disc, and the mirror is in such position that when the cover is unlocked and hinged upwardly in relation to the lower body of the compact the mirror will be viewable.

With this invention it is possible to provide a disc of a contrasting design and color in relation to the remainder of the cover and this would tend to provide a more decorative surface. Also, with this invention the mirror is in locked position in the cover without the use of any extraneous fastening elements or bonding agents.

While the invention is shown in relation to a circular compact it will be understood that any other shape would come within the purview of this invention.

I claim:

1. A compact comprising a body member and a cover therefor, said cover being hinged to said body member to permit said cover to be opened and closed with respect to said body member, said cover being integrally formed and having a top end wall, an inwardly extending wall extending from said top end wall and terminating in an inwardly extending flange, with said flange substantially at right angles to said inwardly extending wall, said cover having an enlarged opening bounded by said inwardly extending flange, said inwardly extending wall and flange forming a recessed portion inwardly of the plane of the top of said cover, an inwardly extending lip in said inwardly extending wall coplanar with said top end wall, a mirror insertable from the top of said cover past said lip and positioned in said recessed portion of said cover to close said opening, said mirror surface facing inwardly toward the interior of said body, said lip cooperating with said flange to retain said mirror in said recessed portion.

2. A structure as defined in claim 1 in which a plate is superposed over said mirror and engages said lip to retain the mirror and plate.